United States Patent [19]

Rosenbaum et al.

[11] Patent Number: 4,713,838
[45] Date of Patent: Dec. 15, 1987

[54] AMPLIFIER WITH DOUBLE RAIL OUTPUT

[75] Inventors: Stanley D. Rosenbaum; Calvin Plett, both of Ottawa, Canada

[73] Assignee: Northern Telecom Limited, Montreal, Canada

[21] Appl. No.: 51,802

[22] Filed: May 20, 1987

Related U.S. Application Data

[62] Division of Ser. No. 878,729, Jun. 26, 1986, Pat. No. 4,691,271.

[30] Foreign Application Priority Data

Oct. 28, 1985 [CA] Canada .................................. 493989

[51] Int. Cl.⁴ ............................................. H04M 3/02
[52] U.S. Cl. .................................... 379/252; 330/275
[58] Field of Search ............... 379/252, 253, 254, 255, 379/418, 401, 181, 186, 324, 413; 330/275, 301, 123; 363/59, 60; 323/222

[56] References Cited

U.S. PATENT DOCUMENTS 4,656,659  4/1987  Chea, Jr. .............................. 379/253

Primary Examiner—James L. Dwyer
Attorney, Agent, or Firm—J. E. Moorhouse

[57] ABSTRACT

An amplifier with double rail output being a switchable to single rail output is provided by power pumping circuitry which is controllable by an error detector to deliver modulated power pulses from a d.c. power source to on-following current steering circuits for coupling to either or both of first and second output terminals. In one embodiment the amplifier is envisaged in an integrated circuit form wherein the current steering circuits are provided by switched voltage multipliers of novel structure so that voltage stress of some capacitive elements is reduced, thereby reducing the area these elements would otherwise occupy in the integrated circuit.

8 Claims, 1 Drawing Figure

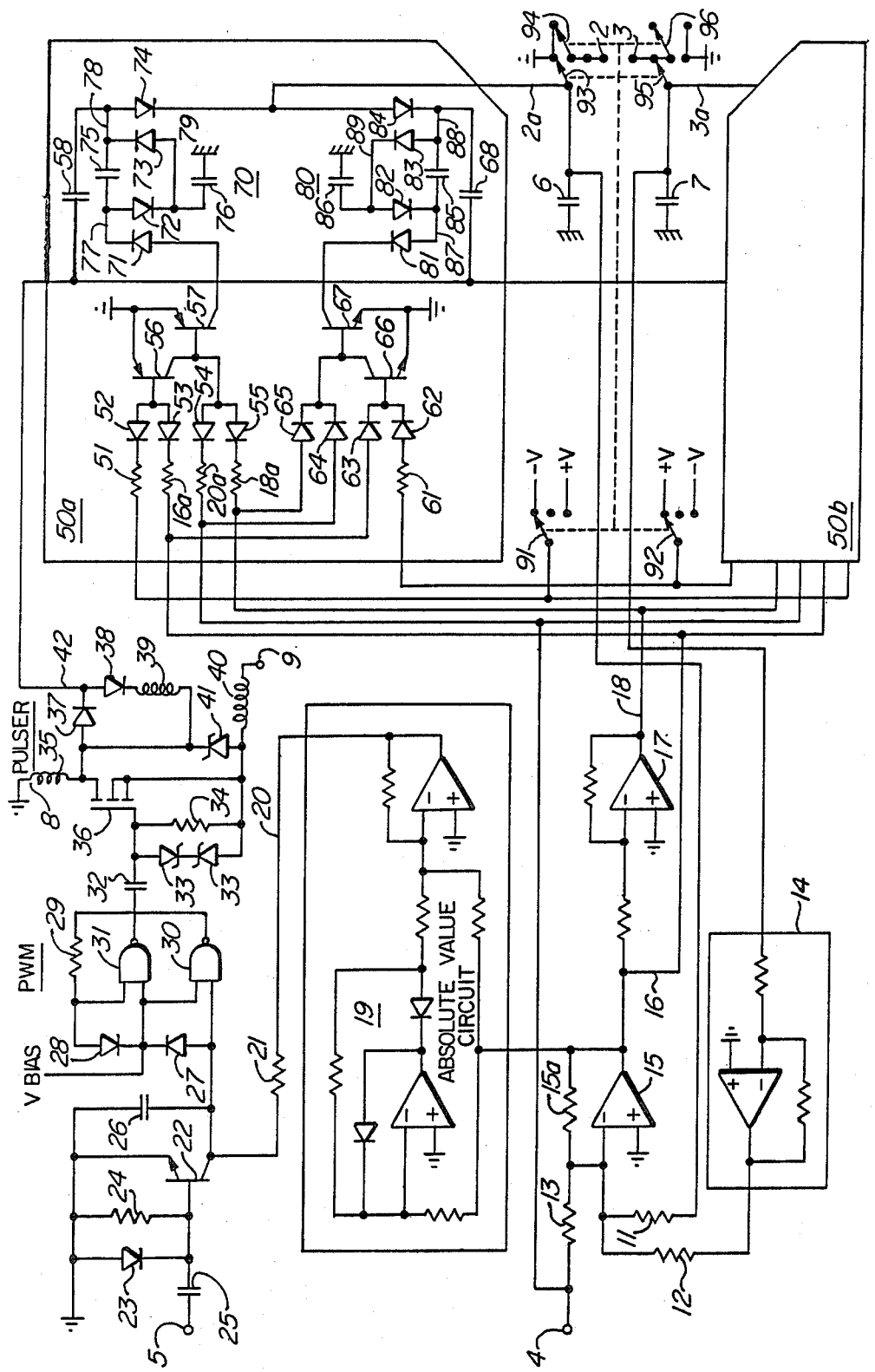

AMPLIFIER WITH DOUBLE RAIL OUTPUT

This is a division of application Ser. No. 878,729, filed June 26, 1986, now U.S. Pat. No. 4,691,271.

FIELD OF THE INVENTION

The invention relates to apparatus and method for providing a single or double railed output signal having either or both of alternating and direct current components and more particularly relates to supplying high level signals, for example telephone ringing signals, to a communication line.

BACKGROUND OF THE INVENTION

In a telephone system, ringing signals are usually required to actuate a ringer in a called telephone set, thereby giving audible indication of a telephone call. A typical ringing signal consists of a d.c. potential of between 45 and 55 volts and an a.c. potential of between 80 and 120 volts RMS being superimposed thereon. The a.c. potential may have a frequency of about 20 Hz which is typical, but frequency division multiplex ringing may require different frequencies in a range of 15 Hz and 100 Hz. In the past it was common for ringers in telephone sets to be connected between either of tip and ring subscriber loop conductors and ground to distinguish tip and ring parties. However recently, private line telephone service is increasingly popular and in the case of private line telephone service the ringer is usually connected across the tip and ring leads. In at least one operating telephone company, ringing signals are supplied from a floating ringing battery source, that is without any reference to ground.

SUMMARY OF THE INVENTION

It is an object of the invention to provide a double rail source of high level telephone signals, which is operable from a typical talking battery or the like in response to a reference signal.

In accordance with the invention an amplification means includes first and second outputs for providing an amplified replica of the reference signal and a complement of same, power terminals for connection to a d.c. power source, and an input. A network includes a first resistor being connected between the first output terminal and the input, a second resistor being connected between the second output terminal and the input, an inverter connected in series between one of the outputs and the respective resistor, and a third resistor being connected between a reference signal terminal, for receiving the reference signal, and the input of the amplification means.

In an embodiment of the invention, an amplification means includes a reference terminal and first and second output terminals. An error detector is responsive to signals applied to the reference terminal for generating a bipolar error signal. A power pumping circuit is connected between the first and second power terminals and includes an output for providing modulated current pulses in response to an absolute amplitude value of the error signal. First and second current steering circuits are capacitively coupled to the output of the power pumping circuit and are responsive to the modulated current pulses and the polarity of the error signal for steering currents to and from the respective ones of the first and second output terminals.

Each current steering circuit includes a pair of switched voltage multipliers being polled opposite one with respect to the other. In one embodiment, the structure of each voltage multiplier is modified with respect to the classical Cockroft and Walton voltage multiplier such that capacitance elements and switch elements are subjected to lesser electrical stress under some operating conditions than would otherwise be so.

A voltage multiplier, in accordance with this aspect of the invention, receives electrical energy at an input terminal and provides direct current at an output terminal. The voltage multiplier includes a plurality of n unidirectional current conductive elements being connected in series between ground and the output terminal and being polled in one and the same direction and defining $n-1$ interconnecting junctions and an $n^{th}$ junction with the output terminal, wherein n is an even number of at least four. A capacitor element is connected between an alternating current ground and each even numbered one of said junctions. A capacitor element is connected between each pair of consecutively odd numbered ones of said junctions. An input capacitor is connected between the input terminal and the $n-1$ junction.

In another embodiment of the invention the amplifier is switchable to operate in one of three operating output modes being a differential output mode, a ring ground output mode and a tip ground output mode.

A method in accordance with the invention for supplying high level telephone signals to a load being connected via tip and ring terminals and a communication line, includes the steps of providing a direct current power source, and providing a reference signal which defines a particular high level telephone signal. An error signal is continuously generated by a weighted algebraic summation of the reference signal and signals at the tip and ring terminals. Electrical energy is stored in an inductor by a momentary conduction of current from the direct current power source, the current so conducted being of a magnitude which is dependent upon an absolute value of the error signal. Thereafter electrical energy is released from the inductor. The released electrical energy is steered in either of two directions, in accordance with a polarity of the error signal, through the load via the tip and ring terminals and the communciation line. The step of storing and releasing is repeated rapidly in response to a clock signal.

BRIEF DESCRIPTION OF THE DRAWING

An example embodiment is discussed with reference to the accompanying drawing which is a schematic diagram illustrating an amplifier in accordance with the invention for providing high level signals including ringing signals in a telephone system.

DETAILED DESCRIPTION

The amplifier in the drawing includes a double railed output, being leads 2a and 3a which are coupled through switches 93, 94, 95 and 96 to corresponding output terminals 2 and 3. Ground connections are indicated for connection to a positive terminal of a battery supply, not shown, and a negative supply (−B) terminal 9 is indicated for connection to a negative terminal of the battery supply. Alternating current ground connections via capacitors 6 and 7 are also indicated for connection to any low impedance in relation to the battery supply. In this example wherein the use intended for the amplifier is that of a high level signal source for a telephone line it is preferred that the a.c. grounds be connected along with the terminal 9 to the negative terminal of the battery supply. Differential amplifiers 15 and 17 connected as shown provide an input for the amplifier whereby an error signal is produced on a lead 16 and its complement is produced on the lead 18. The error signal is derived across a network which includes a resistor 11 connected between the output lead 2a and an inverting input of the amplifier 15, a unity-gain inverter 14 and a resistor 12 connected between the output lead 3a and the inverting input, and a resistor 13 connected between a reference signal terminal 4 and the inverting input.

In operation of the circuit as thus far described, the setting of the switches 93-96 determines which of the output terminals 2 and 3 is grounded or if neither is grounded. The potentials at the output terminals 2 and 3 are applied to the resistor network along with the potential of a reference signal at the terminal 4 such that an inverted algebraic summation of these potentials, that is the error signal, appears at the output 16 of the differential amplifier 15. The remainder of the circuitry, which is discussed in more detail in the following, responds to the error signal by adjusting the potential or potentials at the output terminals 2 or 3, or 2 and 3, as the case may be, to maintain a predetermined operating ratio beween the reference signal and the error signal.

More specifically, the error signal is used by a regulation portion of the amplifier to supply an amount of electrical energy to a load, not shown, connected across the output terminals 2 and 3. The error signal and its complement are used by steering portions of the amplifier at 50a and 50b to determine the polarity of the electrical energy supplied to the load, and in this example to also amplify or multiply the voltage of the electrical energy supplied from the regulation portion of the amplifier.

The regulation portion of the amplifier includes an absolute value circuit 19, which generates a rectified error signal at an output 20 in response to the error signal on the lead 16. A pulse width modulation (PWM) circuit includes a transistor 22, which is supplied with collector current from the output 20 via a resistor 21. Clock pulses, in this example at a frequency of about 2.5 MHz, are supplied from a source, not shown, to the base of the transistor 22 via a clock terminal 5 and a capacitor 25. A diode 23 and a resistor 24, connected as shown, act to provide a preferred operating bias at the base of the transistor 22 in the presence of the clock pulses. During moments when the transistor 22 is OFF, a capacitor 26 is charged via the resistor 21 such that the collector voltage rises toward the potential of the rectified error signal. The more positive the error signal voltage becomes, the further the voltage at the collector rises. Each time the transistor 22 is switched ON, by a positive going portion of the clock pulses at the terminal 5, the capacitor 26 is rapidly discharged with the collector voltage dropping rapidly to less than a volt. This results in a periodic saw tooth-like voltage wave form having a peak amplitude porportional to the voltage of the rectified error signal. Diodes 27 and 28, a resistor 29 and NAND gates 30 and 31, connected as shown, are responsive to the saw tooth-like voltage waveform at the collector of the transistor 22 to generate a rectangular or binary-like waveform for driving an on-following power pulse generator (PULSER). At any one instant one of the NAND gates 30, 31 is ON and the other is OFF and vice versa. A d.c. bias voltage (V BIAS) supplied at a junction of the cathodes of the diodes 27 and 28 determines a transition potential along the saw toothlike waveform at which the states of the NAND gates 30 and 31 change. In this example, the NAND gates 30 and 31 are supplied with energizing current from a power source of about 15 volts potential to provide adequate voltage at the output of the NAND gate 31 to drive the PULSER.

The PULSER includes a switch provided by a field effect transistor (FET) 36, a capacitor 32 connected between a gate electrode of the FET 36 and an output of NAND gate 31. Zener diodes 33 and a resistor 34 provide bias such that the FET 36 is maintained in an ON state at times when the output of the NAND gate 31 is pulsed positive and otherwise is maintained OFF. The FET 36 while in the ON state conducts current between ground and the negative supply (−B) terminal 9 via an energy storage element which limits the current flow, in this example an inductor 8. As is well known by persons skilled in electrical arts, such conduction causes magnetic energy to be stored in association with the inductor 8. When the FET 36 is turned OFF, the magnetic energy is released in the form of an electrical current, to the steering circuit portions 50a and 50b of the amplifier via a diode 37 connected in series with a lead 42. In this example the inductance value of the inductor 8 is about 150 microhenries. Diodes 38 and 41 and inductors 39 and 40 connected as shown, are not essential but provide a smoothing function which reduces generation of radio frequency interference. The inductance value of the inductors 39 and 40 are between 1/15 and 1/30 of the inductance value of the inductor 8.

The steering circuit portion of the amplifier includes a pair of current steering circuits 50a and 50b which are responsive to polarities of the error signal from the differential amplifier 15 and the inverted error signal from the differential amplifier 17, to the amplitude of the rectified error signal from the absolute value circuit 19, and to switch settings of switches 91 and 92, for their operation. For simplicity of illustration only the structure of the steering circuit 50a is shown in detail, as the structure of the steering circuit 50b is identical. The current steering circuit includes voltage doubler circuits 70 and 80 which are polled opposite one with respect to the other. A switching circuit including diodes 52-55 and transistors 56 and 57 which selectively provide ground at an anode of a diode 71 to enable operation of the voltage doubler circuit 70. Likewise a switching circuit including diodes 62-65 and transistors 66 and 67 which selectively provide ground at a cathode of a diode 81 to enable operation of the voltage doubler circuit 80. A resistor 16a is connected between the output lead 16 and the diodes 53 and 63. A resistor 18a is connected between the output lead 16 and the diodes 53 and 63. A resistor 18a is connected between the output lead 18 and the diodes 55 and 65. A resistor 20a is connected between the reference signal terminal 4 and the diodes 54 and 64. A resistor 51 is connected between the diode 52 and the switch 91 as shown. A resistor 61 is connected between the diode 62 and the switch 92 as shown. The switches 91 and 92 are connected to provide negative, positive or open biases for operation of the diode logic of the switching circuits and include switching members which are operable together with switching members of the switches 93-96, as illustrated by a dotted line indicating mechanical linkage therebetween. Each of the switch devices is illustrated as a mechanical apparatus for simplicity of illustration. It will of course be understood by those skilled in this art that the switch devices are conveniently providable by solid state semiconductor circuits each logically coupled with a storage means for retaining the required state of each switch device, as for example would be a typical arrangement in an integrated circuit embodiment of the invention. In such an integrated circuit embodiment the inductors 8, 39 and 40 are provided by discrete devices.

In operation, the switches are set for any one of three operational configurations. For example, in one extreme setting the configuration illustrated, the terminal 2 is grounded and the terminal 3 is active. Thus a load when connected between the terminals 2 and 3 is driven or supplied with regulated electrical energy via the steering circuit 50b. In another extreme setting the load is supplied from the steering circuit 50a. In a setting intermediate of the two extreme settings the load is differentially supplied via both the steering circuits 50a and 50b in a double railed output configuration with neither of the terminals 2 or 3 being grounded.

In one application of the amplifier in FIG. 1, it is intended for use as a telephone ringing signal generator, capable of supplying up to five telephone sets simultaneously with ringing signals via tip and ring leads of a telephone line being connected across the terminals 2 and 3. It is envisaged that in this application the ringing generator is merely one portion of a semiconductor chip integrated circuit which includes a TDM access system, codec, filter, electronic hybrids, talking battery line feed and supervisory circuits. Some of the more space consuming elements in such an integrated circuit are the capacitor elements in the voltage doublers 70 and 80, particularly if the classical Cockroft and Walton voltage multipliers are used.

In the example embodiment a novel voltage multiplier configuration provides the required voltage doublers. A capacitor 58 is connected between the output of the PULSER and a junction 78 of diodes 74 and 73. A capacitor 75 is connected between the junction 78 and a junction 77 of diodes 71 and 72. A capacitor 76 is connected between a.c. ground and a junction 79 of the diodes 72 and 73. In the voltage doubler 80 a capacitor 68 is connected between the output of the PULSER and a junction 88 of diodes 83 and 84. A capacitor 85 is connected between the junction 88 and a junction 87 of the diodes 81 and 82. A capacitor 86 is connected between a.c. ground and a junction 89 of the diodes 82 and 83. The indicated a.c. grounds are connected to the negative supply terminal 9. Electrical energy from the PULSER is coupled to the voltage doubler circuits 70 and 80 by capacitors 58 and 68 respectively. In this configuration voltage stress across the individual capacitor dielectrics is reduced such that the required capacitance is obtainable in a lesser area of chip geography than would otherwise be the case. A second advantage accrues in that the transistors 57 and 67 used with this configuration of voltage multiplier are less severely voltage stressed in the OFF state than would otherwise be the case. Hence the integrated circuit manufacturing process may be advantageously simplified in view of the lesser voltage breakdown requirements of these switches.

What is claimed is:

1. An amplifier for amplifying a reference signal to provide therefrom at least one of an amplified replica of the reference signal and its complement comprising:

a reference signal terminal for application of the reference signal thereto;

amplification means including first and second outputs for supplying at least one of the amplified replica and its complement respectively, first and second power terminals for connection to a d.c. power source, and an input;

a network including a first resistor being connected between the first output and the input, a second resistor being connected between the second output and the input, and a third resistor being connected between the reference signal terminal and the input; and a unity gain inverter being connected in series with one of the first and second outputs and a respective one of the first and second resistors.

2. An amplifier as defined in claim 1 wherein the amplification means comprises:

an error detector being responsive to signals at the reference signal terminal and at least one of the first and second output terminals for generating a bipolar error signal;

power pumping means being connected between the first and second power terminals and having an output for providing modulated current pulses in response to an absolute amplitude value of the error signal; and first and second current steering means having outputs corresponding to the first and second outputs respectively, each current steering means being capacitively coupled to the output of the power pumping means and being responsive to the modulated current pulses and the polarity of the error signal for steering currents to and from the respective output.

3. An amplifier as defined in claim 2 wherein the power pumping means comprises:

an absolute value circuit for generating the absolute amplitude value in response to the bipolar error signal; and a pulser means for generating current pulses of modulated magnitudes in response to the absolute amplitude value.

4. An amplifier as defined in claim 3 wherein the first current steering means comprises:

a first switched rectifier circuit including a first rectifier being polled to rectify positive, a second rectifier being polled to rectify negative voltage and a switching circuit for activating one or the other of the first and second rectifiers in accordance with the bipolar error signal being negative or positive; inputs of the first and second rectifiers being capacitively coupled to receive current pulses from the pulser means and outputs of said rectifiers being connected to a first output terminal; and wherein the second steering circuit comprises:

a second switched rectifier circuit including a first rectifier being polled to rectify positive voltage, a second rectifier being polled to rectify negative voltage, and a switching circuit for activating one and the other of the first and second rectifiers in accordance with the bipolar error signal being positive or negative; inputs of the first and second rectifiers being capacitively coupled to receive current pulses from the pulse means and outputs of said rectifiers being connected to a second output terminal.

5. An amplifier as defined in claim 4 wherein each of the switched rectifiers comprises:
   a plurality of n unidirectional current conductive elements being connected in series between ground and the output terminal and being polled in one and the same direction and defining n−1 interconnecting junctions and an $n^{th}$ junction with the output terminal wherein n is an even number of at least four;
   a capacitor element being connected between an alternative current ground and each even numbered ones of said junctions;
   a capacitor element being connected between each pair of consecutively odd-numbered ones of said junctions;
   an input capacitor element being connected between the input terminal and the n−1 junction; and
   a switch means being connected between ground and the n−(n−1) unidirectional conductive element.

6. An amplifier as defined in claim 4 and further comprising a switch device being settable to each of three settings for grounding the output of one or the other of the first and second outputs or neither of the first and second outputs respectively and for providing a logic signal indicative of the instant setting, each of said switched rectifiers being responsive to the logic signal from the switch device to be switched OFF while its respective output is being grounded by the switch device.

7. An amplifier as defined in claim 5 and further comprising a switch device being settable to each of three settings for grounding the output of one or the other of the first and second outputs or neither of the first and second outputs respectively and for providing a logic signal indicative of the instant setting, each of said switched rectifiers being responsive to the logic signal from the switch device to be switched OFF while its respective output is being grounded by the switch device.

8. A method of operating an amplifier connected to a direct current power source and also connected to a load via tip and ring terminals, the method comprising the steps of:
   (a) providing a reference signal and a clock signal;
   (b) continuously generating an error signal in response to a weighted algebraic summation of the reference signal and signals at the tip and ring terminals;
   (c) inductively storing electrical energy in proportion to absolute value of the error signal at an instant of a pulse of said clock signal;
   (d) releasing the electrical energy having been stored in step (c) and steering said released energy to the load via one of said tip and ring terminals in accordance with a polarity of ther error signal at the instant of said pulse; and
   (e) repeating the steps (c) and (d) at a pulse repetition rate of the clock signal.

* * * * *